United States Patent [19]

Ziegelmeyer

[11] 4,267,751
[45] May 19, 1981

[54] SAW CHAIN DEPTH-GRINDING APPARATUS

[76] Inventor: Lynn J. Ziegelmeyer, P.O. Box 1112, Medford, Oreg. 97501

[21] Appl. No.: 94,885

[22] Filed: Nov. 16, 1979

[51] Int. Cl.³ .............................................. B23D 63/16
[52] U.S. Cl. ........................................ 76/25 A; 76/42
[58] Field of Search ............................ 76/37, 25 A, 42

[56] References Cited

U.S. PATENT DOCUMENTS

| | | | |
|---|---|---|---|
| 2,410,828 | 11/1946 | Lofstrand, Jr. | 76/43 |
| 3,717,051 | 2/1973 | Silvey | 76/25 A |
| 4,084,452 | 4/1978 | Simington | 76/42 |
| 4,104,793 | 8/1978 | Simington | 76/25 A |

FOREIGN PATENT DOCUMENTS 2224993  10/1974  France ............................... 76/25 A

*Primary Examiner*—Nicholas P. Godici
*Assistant Examiner*—Roscoe V. Parker
*Attorney, Agent, or Firm*—Kolisch, Hartwell & Dickinson

[57] ABSTRACT

Apparatus for grinding depth gauges in a saw chain. The chain is composed of plural cutter links, each having a depth gauge and a cutter blade. The apparatus includes a stationary grinding wheel and a platform on which a selected cutter link is mounted, for shifting therewith toward and away from the wheel. A guide member mounted adjacent the wheel is positioned to contact the cutter blade of the selected link, to limit the closest approach between the wheel and the associated depth gauge. The latter is ground thereby to a selected depth relative to the associated cutter blade. Also disclosed is mechanism for positioning each of a succession of such links at a preselected position on the platform.

8 Claims, 5 Drawing Figures

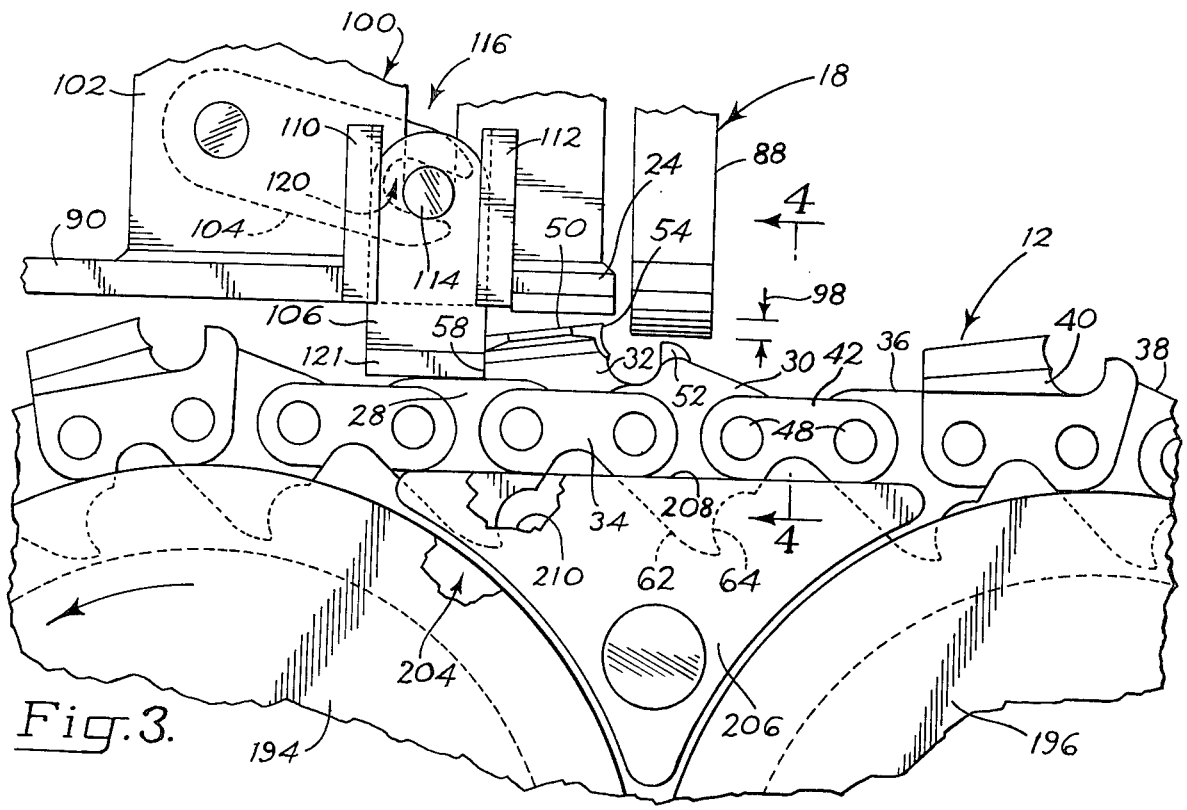
Fig.3.
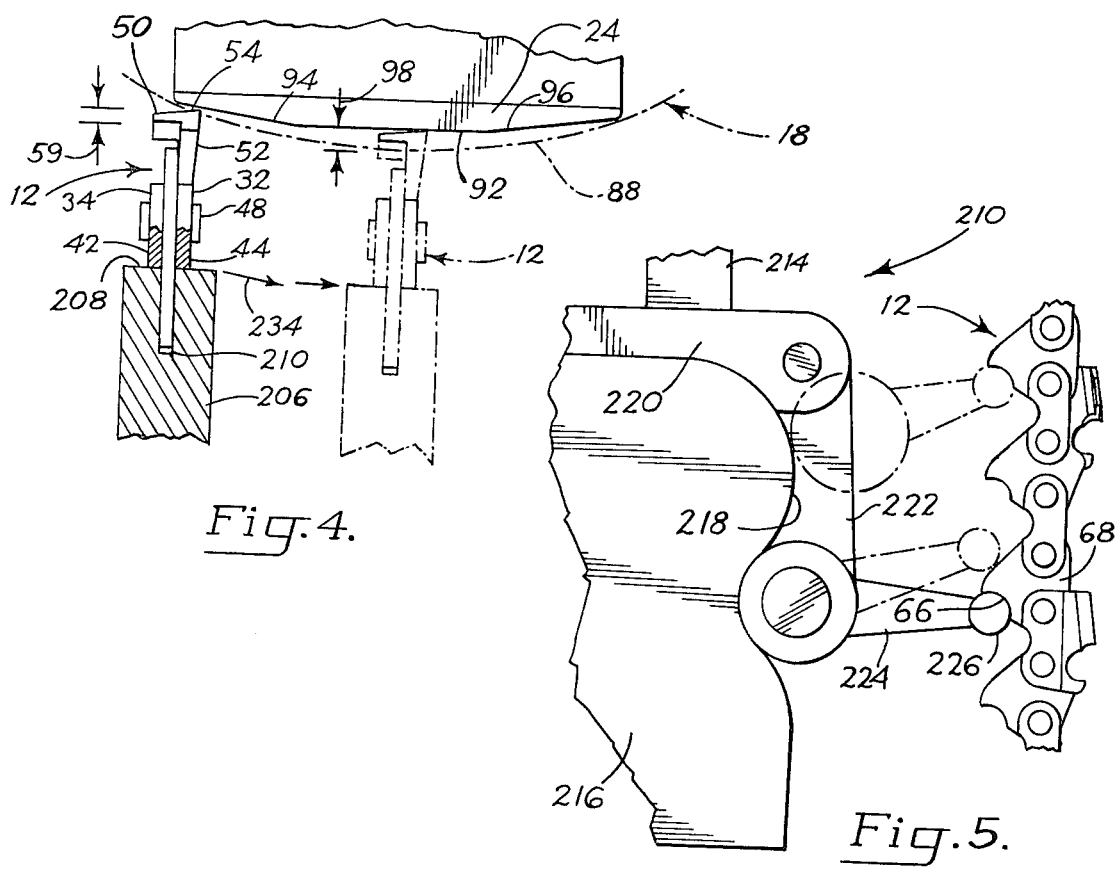
Fig.4.
Fig.5.

SAW CHAIN DEPTH-GRINDING APPARATUS

BACKGROUND AND SUMMARY

The present invention is directed to saw chain grinding apparatus, and more particularly, to apparatus for grinding depth gauges in a saw chain.

A saw chain, as the term is used herein, refers to an endless chain composed of plural cutter links. Each link provides, on its outer, cutting surface, a depth gauge and a cutter blade spaced therefrom. In chain saw operation, the depth gauge leads the cutter blade, with contact between the depth gauge and the article being cut serving to space the chain from the article for optimal cutting by the soon-to-arrive cutter blade. The depth of cut, i.e., the height that the cutter blade should project above the depth gauge, varies typically between about twenty and fifty mils.

Some apparatus for grinding depth gauges in a saw chain are known in the prior art. Such apparatus operate to grind each depth gauge to a selected depth relative to the base portion of the associated cutter link, not relative to the cutter blade. An apparent disadvantage of this approach arises when the cutter blades of the chain links have become worn or chipped away to various degrees, i.e. where the depths of the various blades, with respect to base portions of associated cutter links, is variable. The depth differential between associated cutter blades and depth gauges are correspondingly variable. This impairs cutting efficiency.

A general object of the present invention is to provide apparatus for cutting depth gauges in a saw chain to a selected uniform depth with respect to associated cutter blades in the chain.

More particularly, it is an object of the invention to provide such apparatus wherein the depth of grinding of a depth gauge in a saw chain cutter link is limited by co-action between the associated cutter blade and the apparatus.

Still another object of the invention is to provide such apparatus which is operable to position one of a succession of cutter links in a saw chain at a preselected grinding position.

Still another object of the invention is to provide such apparatus which is adjustable to accommodate a wide variety of saw chain sizes.

The apparatus of the present invention includes a grinding wheel and a platform on which a selected saw chain cutter link is mounted for shifting therewith, toward and away from the wheel. A guide member mounted adjacent the wheel is positioned to contact the cutter blade in the selected link, to limit the closest approach between the wheel and the associated depth gauge. The depth gauge is ground to a selected depth relative to the associated cutter blade.

In a preferred embodiment of the invention, the platform is carried on a pivot arm for shifting therewith along a path substantially tangential to the contacted grinding portion of the wheel's grinding surface. A spring operatively connected to the arm urges the platform toward the grinding wheel, in a direction substantially normal to the just-mentioned tangential path. As the platform is shifted toward the grinding wheel, contact between the cutter blade in the selected cutter link and the guide member produces shifting of the platform in a direction opposite the urging of the spring, to limit the closest approach between the associated depth gauge and the grinding wheel.

Also disclosed herein is mechanism for positioning cutter links in a saw chain at selected positions on the platform.

These and other objects and features of the present invention will become more fully apparent when read in connection with the following detailed description of a preferred embodiment of the invention, and the accompanying drawings, wherein:

FIG. 3 is an enlarged, front view of the portion of the apparatus shown generally within the dashed-dot line rectangle denoted at 3 in FIG. 1;

FIG. 4 is a sectional view taken generally along line 4—4 in FIG. 3; and

FIG. 5 is an enlarged, front-on view of the portion of the apparatus shown generally within the dashed-dot line rectangle denoted at 5 in FIG. 1.

DETAILED DESCRIPTION OF A PREFERRED EMBODIMENT OF THE INVENTION

Figures 1, 2:
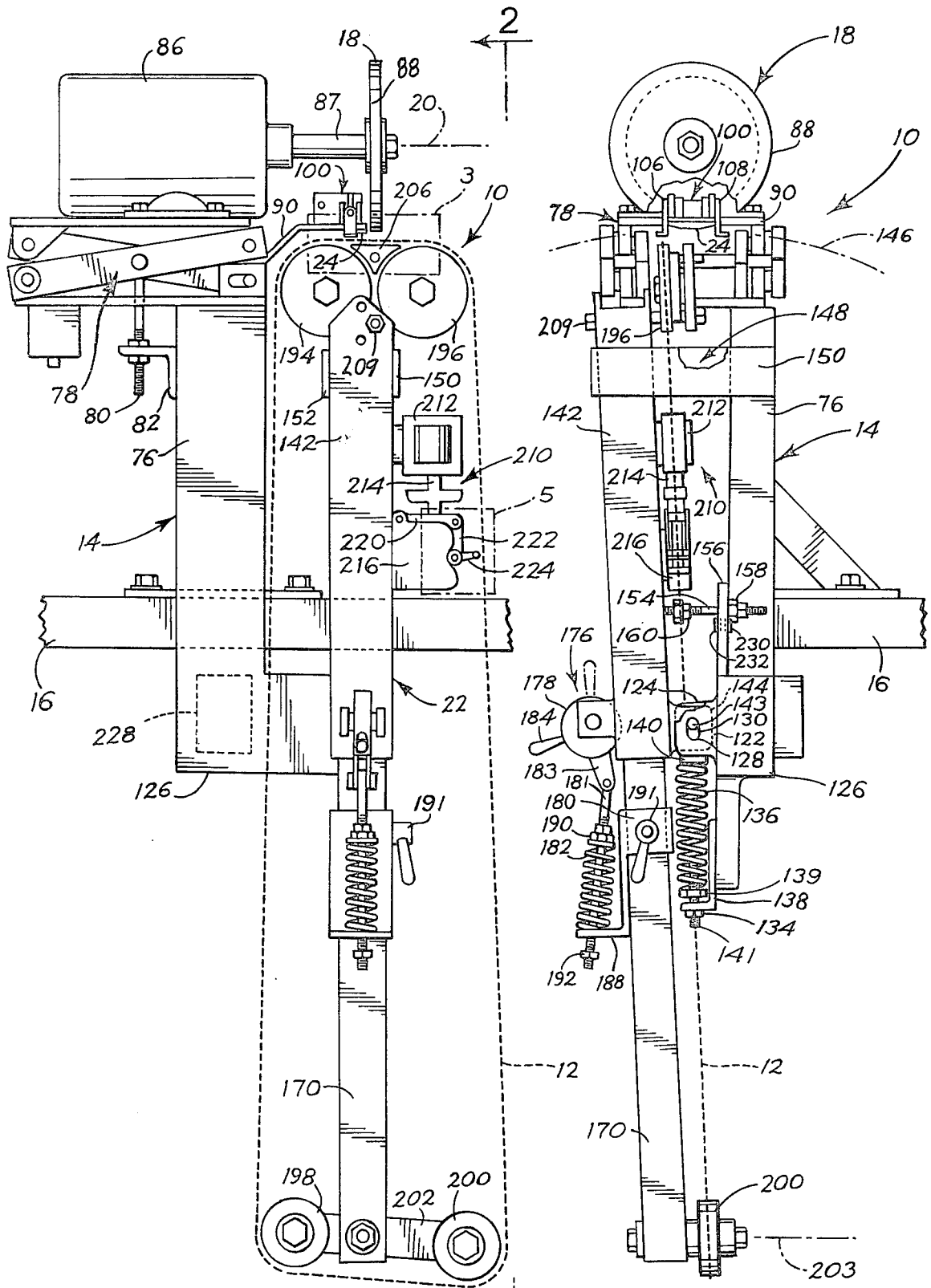
FIG. 1 is a front-elevation view of grinding apparatus constructed according to an embodiment of the present invention, shown here in operative condition.
FIG. 2 is a side view of apparatus shown in FIG. 1, taken generally along line 2—2 in FIG. 1.

Looking now at the figures, and first particularly at FIGS. 1 and 2, there is shown at 10 grinding apparatus constructed according to the present invention. Apparatus 10 is operable to grind depth gauges of a saw chain, such as the chain indicated schematically by dashed lines at 12. The apparatus generally includes a frame 14 which is adapted to be mounted on the edge of a table 16 or the like. Mounted on frame 14, at the upper portion thereof in FIGS. 1 and 2, is a power-driven grinding wheel 18 which is rotatable about an axis indicated by dashed-dot line 20 in FIG. 1.

Chain 12 is carried on a pivot arm 22 for movement therewith toward and away from wheel 18, in a manner to be described. A guide member 24 mounted on frame 14 co-acts with portions of chain 12 to limit the closest approach between the chain and the wheel, as will be detailed below. Also included in apparatus 10 is mechanism, or means, for positioning chain 12 at selected positions on arm 22, also to be described more fully below.

Details of portions of a chain 12 are illustrated in FIGS. 3–5. With reference to FIGS. 3 and 4, chain 12 is composed of alternating pairs of chain sequences, each sequence being composed of a pair of center links, such as links 28, 30 which are joined, at one side thereof, by a cutter link, such as link 32, and at the opposite side thereof by a tie strap, such as strap 34. Similarly, an adjacent chain sequence in chain 12 is composed of a pair of center links, 36, 38, which are joined, at opposed sides thereof, by a cutter link 40 and a tie strap (not seen). Adjacent cutter links, such as links 32, 40 are attached to opposed sides of the chain, as seen in FIG. 3. Adjacent chain sequences, such as the two sequences including adjacent center links 30, 36 are joined, on opposed sides thereof by a pair of tie straps, such as straps 42, 44 (FIG. 4). The just-mentioned cutter links and tie straps are also referred to collectively herein as side-joining members. These members are joined to the center links by pivot pins, such as pins 48.

With continued reference to FIGS. 3 and 4, cutter link 32, which is representative, includes a cutter blade 50 and depth gauge 52. In its operative setting in a chain saw, the chain is powered in a direction wherein the depth gauge leads the cutter blade in each cutter link. As seen in FIG. 3, blade 50 slopes downwardly from a leading, cutting edge 54, terminating at a trailing edge 58 which extends substantially normal to the direction of chain travel. The depth differential between blade 50 and gauge 52, is indicated by spacing 59 in FIG. 4. Typically, it is desired to grind the chain depth gauges by the apparatus of the present invention, to produce in each cutter link such a spacing of between about thirty to forty mils.

Completing the description of chain 12, each center link includes a tooth portion, such as portion 62 associated with link 30 (FIG. 3). The leading edge of each tooth portion has formed therein a somewhat rounded notch, such as notch 64 associated with link 30 in FIG. 3 and notch 66 associated with link 68 in FIG. 5. These notches are utilized in advancing the chain on apparatus 10, in a manner to be described.

Looking now at details of apparatus 10, and with reference first to FIGS. 1 and 2, frame 14 includes an L-shaped frame bar 76 which is mountable to a table, such as table 16, conventionally, by bolting or clamping. A scissor lift 78 is mounted on the upper end of bar 76 as shown. Lift 78 is vertically adjustable, conventionally, by selected positioning of a lift bolt 80 with respect to a bracket 82 carried on bar 76, as can be appreciated with reference to FIG. 1. Lift 78 is also referred to herebelow as depth-setting means.

An electric motor 86 is secured to the upper platform of lift 78. The motor provides a powered rotary shaft 87 to which wheel 18 is secured for rotation therewith, about axis 20. Saw chain grinding occurs at the cylindrical grinding surface 88 (FIGS. 1, 2, 3 and 4) of wheel 18. Motor 86 and wheel 18 rotatably mounted thereon are also referred to as grinding means.

A bracket 90 is rigidly secured, as by welding, to the upper portion of bar 76 and projects therefrom toward wheel 18, as shown in FIG. 1. Member 24, which is also referred to herein as guide means, is rigidly secured to the right edge portion of bracket 90, as seen best in FIG. 3. As shown in FIG. 4, the lower surface of member 24 includes a lowermost, central portion 92 occupying a substantially horizontal plane, and side portions 94, 96 inclined upwardly on progressing away from portion 92. Portions 92, 94, 96 are formed of hardened steel to withstand repeated contact with cutter blades. The just-mentioned plane occupied by portion 92 is spaced above the lowermost portion of surface 88 of wheel 18. The vertical spacing therebetween is denoted 98 in FIGS. 3 and 4. Spacing 98 determines the depth to which the depth gauges of a chain, such as chain 12, are ground relative to the associated cutter blades. Such spacing is selectively adjustable by raising or lowering the position of wheel 18, by adjustment of lift 78, as has been indicated.

Also mounted on bracket 90, adjacent member 24, is a chain-stop assembly, denoted generally at 100 in FIGS. 1–3. Assembly 100 includes a solenoid 102 (FIG. 3) which is actuatable, in a manner to be described, to pivot an arm 104 between a lowered position, shown in FIG. 3, wherein the arm is directed somewhat downwardly, and a raised position (not shown) wherein the arm is directed somewhat upwardly. In the absence of solenoid actuation, arm 104 is spring biased toward its raised position. Assembly 100 also includes a pair of opposed, L-shaped legs 106, 108 (FIGS. 2 and 3). Each of these legs is mounted for vertical shifting between a pair of opposed channel members, such as members 110, 112, mounted on bracket 90 (see FIG. 3).

Legs 106, 108 are secured to opposed ends of a rod 114 which is vertically shiftable within a channel 116 (FIG. 3) formed between solenoid 102 and member 24. Rod 114 is also received within a channel 120 formed in the right end portion of arm 104 in FIG. 3. As can be appreciated in this figure, as arm 104 is shifted from its lowered toward its raised position, rod 114, and attached legs 106, 108, are shifted from lowered positions, shown in FIG. 3, toward raised positions. With the legs in their lowered positions, the foot of each leg, such as foot 121 of leg 106, extends directly into the path of a trailing edge, such as edge 58, of a cutter link, such as link 32, when arm 22 is positioned at one of two tilted positions, to be described. With the legs in their raised positions, cutter links may pass freely therebelow. Assembly 100 is also referred to herebelow as stop means, and forms part of the above-mentioned positioning means.

Turning now to FIG. 2, a pair of upright arm-support plates 122, 124 are attached, as by welding, to the longitudinally extending foot 126 of bar 76, as shown. Plates 122, 124 are spaced apart, to form a vertically extending channel therebetween. In each plate is formed a somewhat oblong, upright opening, such as opening 128, in plate 122. This opening, and the coincident opening in plate 124 form an oblong, upright channel 130, which serves a purpose to be described.

Arm 22 includes a tubular pivot post 142 which is formed of a square, hollow metal tubing section. A pair of spaced apart ears, such as ear 144 seen in FIG. 2, is attached, as by welding, to a lower portion of post 142. These ears are dimensioned to be received slidingly between members 122, 124 on frame bar 76. A pivot pin 143 extending through the channel-forming openings, such as opening 128, in plates, such as plate 122, and through suitable aligned openings in the just-mentioned ears functions to mount arm 22 pivotally on frame 14.

The weight of arm 22 is supported by a compression spring 136 which is mounted, adjacent its lower end in FIG. 2, on an L-shaped frame bracket 138. More specifically, the lower end of spring 136 is supported by a nut 139 carried on a threaded bolt 141, secured to the clamp as shown. The upper end of spring 136 is received in a suitable spring seat 140 attached, as by welding, to the lower edges of ears, such as ear 144, also as shown. It can be appreciated that adjustment of nut 139 acts to raise or lower the supported position of spring 136, thus to shift the position of pin 143 within channel 130.

Arm 22 thus is mounted on frame 14 for pivotal movement about pin 143 and for limited, substantially vertical movement with pin 143 in channel 130. The pivotal movement carries the upper end of arm 22 in FIG. 2 along an arcuate path indicated by dashed-dot line at 146 in FIG. 2, wherein a cutter link on the platform travels along a path having as its tangent a horizontal plane containing the lowermost portion of surface 88. The vertical movement carries arm 22 along a path substantially normal to path 146. Spring 136, as noted above, urges arm 22 in an upward direction in FIGS. 1 and 2 along the vertical path. Spring 136 is also referred to herein as spring means.

The extent of arcuate travel of post 142 along path 146 is limited by the extent of travel of a threaded bolt 154 attached to the right side of post 142 in FIG. 2, within a generally upright, somewhat oblong opening (not shown) in a stop member 156 attached to bar 76.

Specifically, a pair of locking nuts 158, 160 are contactable with right and left sides of stop member 156 in FIG. 2 to constrain arm 22 at first (shown in FIG. 2) and second tilted positions, respectively. Arm 22 is guided for movement between such tilted positions within a guideway 148 (FIG. 2) formed by a pair of guide plates 150, 152 (FIG. 1) mounted on opposed sides of bar 76. Arm 22 and structure therein is also referred to herein as means mounting a chain cutter link for movement therewith toward and away from wheel 18.

Arm 22 further includes a lower extension member 170 formed of a square, hollow metal tube section dimensioned to be slidably received within post 142. Member 170 is selectively positionable, relative to post 142, by a clamping assembly denoted at 176 in FIG. 2. Included in this assembly are a cam wheel 178 and a clamp 180 operatively connected to wheel 178 by a threaded bolt 181 and a compression spring 182. Wheel 178 is mounted eccentrically on post 142, and is rotatable thereon, between operative and locking positions, wherein sliding movement of member 170 with respect to post 142 is permitted and prevented, respectively. Rotation of wheel 178 from its operative toward its locking position is effected by movement of a lever 184 from a position shown in solid lines in FIG. 2 toward one shown in dotted lines.

Bolt 181 is pivotally attached, at its upper end in FIG. 2, to an arm 183 mounted on wheel 178 for rotation therewith. Bolt 181 extends, adjacent its lower end, movably through a foot 188 forming part of clamp 180. Spring 182 is confined on bolt 181 between a nut 190 adjustably carried adjacent the upper end of the bolt and the upper surface of foot 188. A nut 192 adjustably carried adjacent the lower end of bolt 181 contacts the lower surface of foot 188 when wheel 178 is in its clamping position.

Clamp 180, which receives member 170 slidably therethrough, includes locking device 191 operable to lock clamp 180 in a selected position along member 170.

A saw chain, such as chain 12, is mounted on arm 22, for endless movement relative thereto, on upper and lower pairs of chain wheels. These include upper wheels 194, 196 (FIGS. 1 and 3) mounted adjacent the upper end of post 142 for rotation relative thereto, and lower wheels 198, 200 rotatably mounted adjacent opposed ends of a bar 202, (seen in FIG. 1). Bar 202 is mounted adjacent the lower end of member 170 for pivoting about an axis indicated by dashed-dot line at 203 in FIG. 2. Each of the four just-mentioned wheels rotates about an axis substantially paralleling axis 203. Further, each of the wheels, such as wheel 194 seen in FIG. 3, includes a circumferential groove, such as groove 204, dimensioned for receiving tooth portions of the chain therein.

A generally triangular platform 206 is mounted on arm 22, adjacent the upper end thereof, between wheels 194, 196, as seen in FIG. 3. The platform and adjacent wheels 194, 196 are selectively pivotable, as a unit, about an upper end region of post 142, for angular adjustment therewith, by rise of a nut and bolt combination indicated at 209. Platform 206 provides an elongate platform surface 208, the long axis of which is substantially tangent to upper portions of wheels 194, 196. Moreover, the angular disposition of surface 208 is adjustable, in the manner just indicated, to align the just-mentioned platform axis parallel with the plane containing surface portion 92. Platform 206 includes an upper, central edge groove 210 for receiving tooth portions of the chain therein, this groove being aligned with adjacent grooves, such as groove 204, formed in the adjacent wheels. Thus, as a saw chain, such as chain 12, is moved endlessly on arm 22, a portion of the chain is supported on platform 206, as seen in FIG. 4.

Turning now to FIGS. 1 and 5, indicated generally at 210 is a chain-advancing mechanism or means operable to advance a saw chain, such as chain 12 mounted on arm 22, in increments corresponding roughly to the distance between adjacent chain sequences. Mechanism 210 includes a solenoid 212 which is secured to post 142. The solenoid provides an armature 214 which is selectively movable between an extended position shown in FIG. 1, and an upwardly moved, retracted position. Also included in mechanism 210 is a lever mounting member 216 which is secured to post 142, adjacent and below solenoid 212, as shown. Member 216 provides, at its upper right portion in FIG. 5, a camed surface indicated generally at 218. Pivotally mounted at the upper left portion of member 218 in FIG. 1 is a lever 220 having pivotally connected at its right end in FIGS. 1 and 5, a connector 222 joining lever 220 to a pawl 224. The pivotal connection between section 222 and pawl 224 is spring-loaded, to urge the spring in a clockwise direction toward the substantially horizontal position, Shown in FIG. 5. A cylindrical pusher 226 is secured to the right end of pawl 224 for engaging tooth portions of a chain, and more particularly, the notches, such as notch 66 in the links, such as link 68, thereof. It can be appreciated from the foregoing that as solenoid 212 is actuated, thus to raise armature 214 toward its retracted position, lever 220 is pivoted upwardly, carrying pawl 224 upwardly and outwardly (toward the right), as the left surface of the pawl rides over surface 218 in FIG. 5.

Completing the description of apparatus 10, a control unit 228 seen in FIGS. 1 and 2 is operatively connected to solenoids 102, 212 by suitable electrical connections, for supplying control signals thereto, in a manner to be described below. The condition of unit 228 is controlled by contact switches 230, 232 mounted on member 156 (FIG. 2). These switches are positioned to be contacted by nuts 158, 160, respectively, when arm 22 is moved to its first and second tilted positions, respectively.

Operation of apparatus 10 will now be described. Initally, wheel 178 is placed in its locking position to clamp member 170 thereto, and lever 191 in clamp 180 is loosened to permit sliding of the clamp relative to member 170. A saw chain, such as chain 12, is then draped about upper wheels 194, 196, being received within the grooves thereof, and the groove in platform 206. Wheel 178 is then moved slightly away from its locking position, by slight counterclockwise movement of lever 184 in FIG. 2, to permit free sliding of member 170 within post 142. Member 170 is lowered until suitable lower portions of chain 12 are received within the circumferential grooves in wheels 198, 200. At such position, the weight of member 170 is supported by chain 12, producing moderate tension therein and limiting further downward movement of member 170. Lever 191 in clamp 180 is tightened, to secure the clamp to member 170, and wheel 178 now is rotated fully to its operative position, causing bolt 181 to be moved in a generally downward direction in FIG. 2, wherein spring 182 is compressed against foot 188. The tension in spring 182 is transmitted to chain 12 to hold the same in a spring-biased state between the upper and lower pairs of chain-guide wheels. As seen in FIG. 2, the compression of spring 182, when wheel 178 is in its operative position, is directed to the right of the wheel pivot, serving to maintain the wheel in its operative position.

With a chain, such as chain 12, mounted on arm 22 as just described, nut 139 is adjusted to produce a slight spring bias of pin 143 against the top of channel 130. At this adjustment position, arm 22 may be shifted downwardly, against the action of spring 136, by a slight downward force, for a purpose to be described.

With arm 22 in its first tilted position, shown in FIG. 2, and solenoid 102 in its lowered position, legs, such as leg 106, are positioned to contact a trailing edge, such as edge 58, of a cutter link, such as link 32, when the chain is moved in a counterclockwise direction as shown in FIGS. 1 and 3. A selected chain link, such as link 32, is now in a selected grinding position on platform 24.

Manual shifting of arm 22 along path 146 advances selected link 32 toward a grinding position, shown in dashed-dot line in FIG. 4. As the link approaches this position, the upper edge of blade 50 contacts surface portion 94, forcing arm 22 to move along a somewhat downwardly directed path indicated by arrow 234 in FIG. 4. The downward movement of the arm is accommodated by movement of pivot pin 143 within channel 130, against the urging of spring 136, whereby blade 50 is urged against surface portion 92. As chain 12 approaches its grinding position, movement of link 32 toward wheel 18 is limited to a closest approach determined by spacing 98. More particularly, at the grinding position, depth gauge 52 is ground to a selected depth, relative to cutter blade 50, equal to spacing 98. It is noted here that the just-described depth gauge grinding occurs when arm 22 is moved along path 146, through the grinding position, in either direction.

Continued movement of arm 22 to its second tilted position activates switch 232, thus signalling unit 228. The latter activates solenoid 212, producing upward, outward movement of pawl 224 as has been described. With reference to FIG. 5, this movement brings pusher 226 into contact with a tooth portion, such as portion 66, of a center link, such as link 68, producing counter-rotation of the chain when viewed in FIG. 1. The outward movement of pusher 226 maintains the same in pushing engagement with a center link, such as link 68, during chain advance. The outward expansion of chain 12, locally in the region of pawl 224, is accommodated by slight upward movement of member 170 against the biasing action of spring 182, as can be appreciated with reference to FIG. 2.

As noted above, arm 104 is normally biased toward its raised position, wherein legs 106, 108 are raised to permit a cutter link, such as link 32, to pass therebelow. During chain advance, as the just-ground cutter link passes below legs 106, 108, but before the successive cutter link arrives at the above-mentioned preselected position on the platform, solenoid 102 is activated, under the control of unit 228, to lower the legs. Chain movement continues, under the operation of solenoid 212, until the trailing edge of the next cutter link, in this case, link 40, makes contact with one of the two legs, in this case leg 108, preventing further chain advance. Subsequently, solenoid 212 is returned to its retracted position, with spring-biased counterrotative pivoting of pawl 224, seen in dashed-dot lines in FIG. 5, permitting the same to move downwardly across tooth portions of the chain. Chain 12, and in particular the next cutter link 40 therein, is now selectively positioned on platform 206 to permit grinding of the depth gauge thereof in the manner just described with reference to cutter element 32.

From the foregoing, it can be appreciated that once grinding operation has been initiated, the operator need only manually move arm 22 back and forth, between its first and second tilted position, with each such movement producing a grinding of the depth gauge of one cutter link, and subsequent chain advance to the next successive chain link.

It can be appreciated now how various objects of the present invention are met. In particular, the present invention produces grinding of the depth gauges of a saw chain to a selected uniform depth with respect to the associated cutter blades in each cutter link of the saw chain. Importantly, the depth to which the depth gauges are ground is independent of the depth of the cutter blade with respect to the base portion of the associated cutter link. Secondly, the chain positioning mechanism described herein advances cutter links of a chain saw, successively, to selected positions on the apparatus, as the pivot arm is swung alternately between extreme tilted positions. Finally, the present apparatus is adjustable, through the telescoping feature of arm 22, to accommodate a wide variety of saw chain sizes.

While a particular embodiment of the present invention has been described herein, it is obvious that various changes and modifications may be made without departing from the spirit of the invention.

It is claimed and desired to secure by Letters Patent:

1. Apparatus for grinding the depth gauge of a saw chain cutter link having a cutter blade adjacent said depth gauge, said apparatus comprising
    grinding means having a grinding surface contactable by said depth gauge,
    means mounting said cutter link for movement toward and away from said grinding surface, and
    guide means adjacent said grinding means positioned to be contacted by said cutter blade to limit the closest approach between said depth gauge and said grinding surface, whereby said depth gauge is ground by said grinding means to a selected depth relative to said cutter blade.

2. The apparatus of claim 1, which further includes depth-setting means operable to vary the position of said guide means with respect to said grinding surface, thus to vary such closest approach.

3. The apparatus of claim 1, wherein said mounting means includes a platform mounted for shifting along an arcuate path, whereby a cutter link therein travels on a path substantially tangential to said grinding surface, and said apparatus further includes spring means yieldably urging said platform in a direction substantially normal to such path, toward said grinding surface, with contact between a cutter blade positioned on said platform and said guide means producing, as said platform is shifted along such path, concomitant shifting of said platform in a direction opposite such direction, to a position of such closest approach.

4. The apparatus of claim 1, operable to grind depth gauges in an endless saw chain having a plurality of such cutter links, wherein said mounting means includes a platform, and said apparatus further includes means for positioning each of a succession of such links at a preselected position on said platform.

5. The apparatus of claim 4, wherein said positioning means includes advancing means operable to advance such chain in a preselected direction, and stop means actuatable, during operation of said advancing means, to contact one of a succession of such links, thus to terminate the chain's advance at a position corresponding to said preselected position.

6. Depth gauge grinding apparatus for a saw chain having multiple cutter links, each link having a depth gauge and a cutter blade spaced therefrom, said apparatus, in operative condition, comprising grinding means having a grinding surface contactable by a cutter link depth gauge, to reduce the depth of the same by grinding, a platform mounted for shifting toward and away from said grinding surface along an arcuate path substantially tangential to said grinding surface and concomitantly along a linear path substantially normal to said arcuate path, spring means urging said platform toward said grinding surface along said linear path, means for positioning a selected cutter link at a preselected position on said platform, guide means mounted adjacent said grinding means positioned to be contacted by the cutter blade of such selected cutter link, when said platform is shifted along said arcuate path, wherein said platform is shifted along said linear path, against the urging of said spring means, to limit the closest approach between said depth gauge and said grinding surface, wherein said depth gauge is ground to a selected depth with respect to the associated cutter blade, and means operable to vary the position of said guide means with respect to said grinding surface to vary such closest approach.

7. The apparatus of claim 6, wherein said positioning means includes advancing means operable to advance such chain in a preselected direction, and stop means actuatable, during operation of said advancing means, to contact one of a succession of such links, thus to terminate the chain's advance at a position corresponding to said preselected position.

8. Apparatus for grinding the depth gauge of a saw chain cutter link where the cutter link includes a cutter blade spaced along the link from the depth gauge comprising, grinding means for engaging the end of the depth gauge, cutter link mounting means for mounting the cutter link, a mounting for the grinding means and cutter link mounting means accommodating relative movement of the two to produce relative movement of the grinding means across the end of the depth gauge, and guide means engageable with the cutter blade on such relative movement of the grinding means across the end of the depth gauge serving to relate the amount that the end of the depth gauge is ground to the height of the cutter blade in the cutter link.

* * * * *